Nov. 21, 1933.  R. W. KAATZ  1,936,133
SILO
Filed Nov. 3, 1931  3 Sheets-Sheet 1

Inventor
R. W. Kaatz
By Watson E. Coleman
Attorney

Nov. 21, 1933.   R. W. KAATZ   1,936,133
SILO
Filed Nov. 3, 1931   3 Sheets-Sheet 2
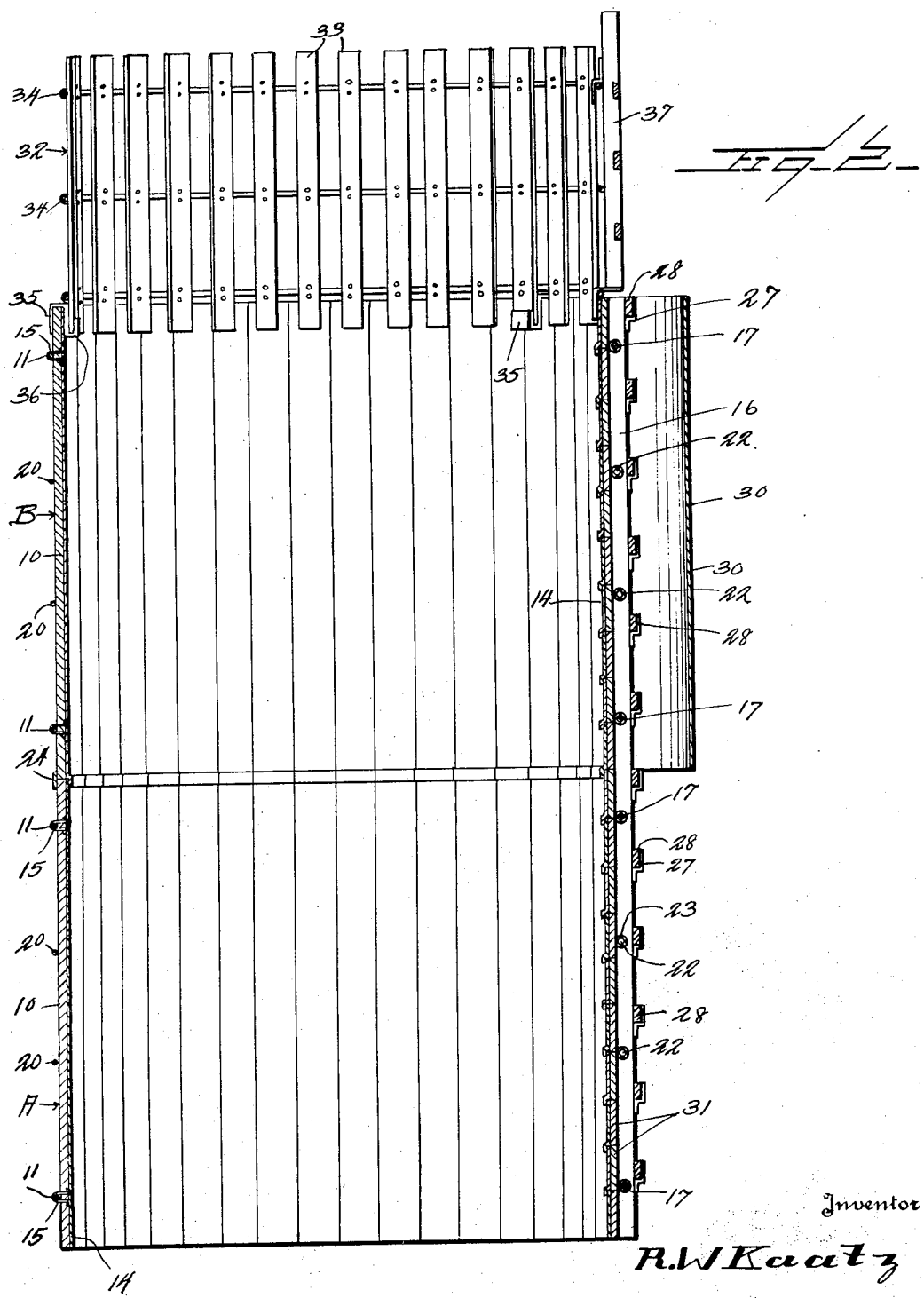

Nov. 21, 1933. R. W. KAATZ 1,936,133
SILO
Filed Nov. 3, 1931 3 Sheets-Sheet 3
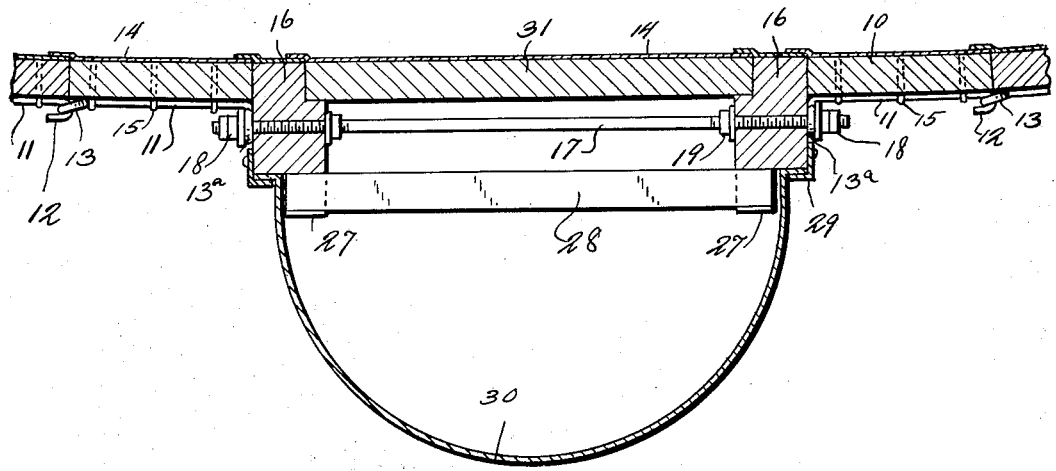
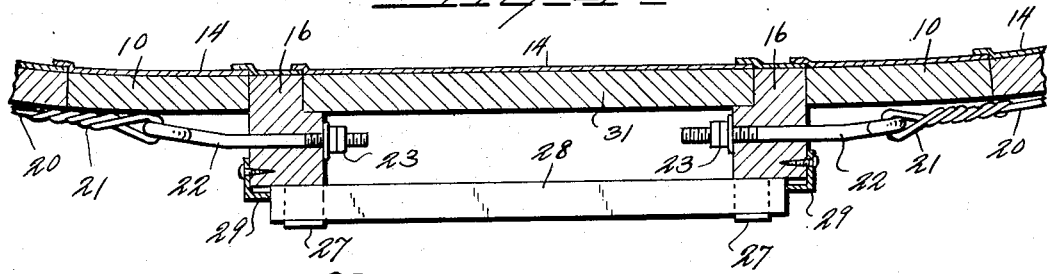
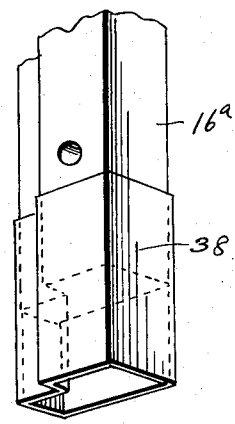
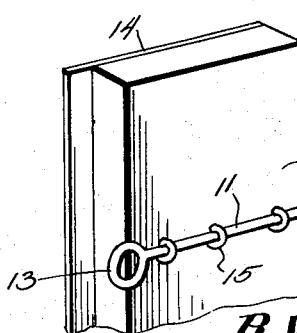

Patented Nov. 21, 1933

1,936,133

UNITED STATES PATENT OFFICE 1,936,133

SILO

Robert W. Kaatz, Revere, Minn.

Application November 3, 1931. Serial No. 572,865

4 Claims. (Cl. 20—1.4)

This invention relates to silos and the general object of the invention is to provide a silo so formed that it may be readily assembled or readily taken down and which is further so constructed that when assembled it will be strong and stable and perform all functions of the ordinary silo.

A further object is to provide a silo of this character formed in sections, each of the sections extending longitudinally of the silo and being provided with a hook and eye arrangement whereby it may be connected to the adjacent sections, the invention further contemplating the use of ties embracing the silo and having means whereby they may be tightened around the sections.

A still further object is to provide a silo of this character with means whereby it may be upwardly extended to any height required and another object is to provide a silo the upper portion of which is formed with a rack as it may be termed, permitting the ensilage to be thrown into the top of the silo to a height above the normal top of the silo and then to sink down into the silo without spilling out over the sides thereof.

A further object is to provide a silo with a sliding chute which, as the ensilage is taken out from the upper portion of the silo may be shifted downward toward the ground.

Other objects will appear in the course of the following description.

My invention is illustrated in the accompanying drawings, wherein:—

Figure 2 is a vertical diagrammatic section through the silo from front to rear;

Figure 3 is a section on the line 3—3 of Figure 1;

Figure 4 is a section on the line 4—4 of Figure 1;

Figure 5 is a fragmentary perspective view of the upper portion of one of the silo sections looking from the exterior thereof;

Figure 6 is a fragmentary perspective view of one of the extension frame members or door jambs.

Figure 1:
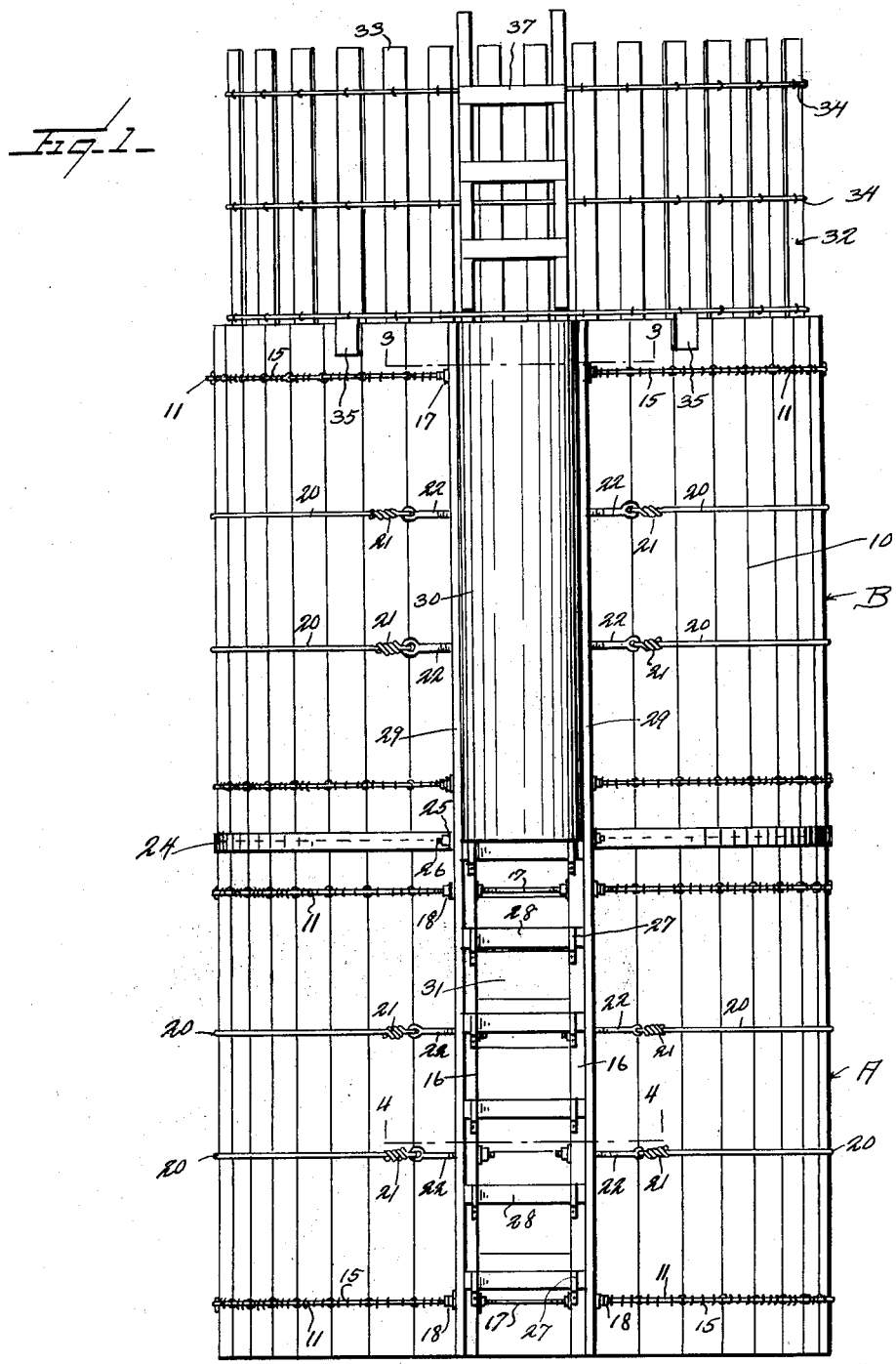
Figure 1 is a front elevation of a silo constructed in accordance with my invention.

Referring to these drawings, it will be seen from Figure 1 that the silo is composed of a plurality of vertically disposed boards or equivalent elements designated 10. The silo is shown as formed of two sections A and B, the section A being disposed upon the ground upon a cement foundation or upon any other suitable structure as may be desired, the section B resting upon the section A. As illustrated most clearly in Figure 5, each board 10 adjacent its upper and lower ends is provided with a link 11 consisting of a metallic bar having at one end a hook 12 and at its other end an eye 13. The inner face of each board 10 has attached to it a lining 14 of paper or other suitable material as will be later adverted to, this lining 14 projecting beyond one edge face of the board 10.

The clips 11 are mounted by staples 15 or other like devices in the outer face of the board and by this means, the several boards may be hooked together and connected as illustrated in Figures 1 and 3. While I have described the board 10 as if it were made of one section or piece, it will be understood that it might be made of a plurality of vertical sections connected as it were by the link 11.

At the vertical opening of the silo, there are disposed as shown in Figure 3 the two upright jambs 16, each of which extends to any desired height, as for instance, the full height of the two sections of the silo. The links 11 which are engaged with those planks or boards 10 disposed immediately on each side of the jambs 16 have their eyes turned outward as at 13a (see Figure 3) and a bolt 17 passes through the two jambs and through these eyes 13a, this bolt carrying upon it the nuts 18 and suitable washers. Nuts 19 are disposed on this bolt 17 and bear against the inside faces of the jambs, as shown clearly in Figure 3. The links 11 are disposed adjacent the upper and lower ends of the section A and adjacent the upper and lower ends of the section B. Intermediate these connected links are the cables 20 or equivalent elements which surround the staves or boards of the silo and at their ends are twisted to form eyes 21 with which the bolts 22 engage, these eye bolts passing through the jambs 16 and carrying the nuts 23. Any number of these intermediate elements 20 may be used.

By the use of the elements 20 and the links 11, the staves or boards of the silo are held in edge abutted relation so as to form a circular silo with the end staves or boards abutted against the jambs 16. Surrounding the silo at the junction of the two sections A and B is a metallic strip 24 whose ends are flanged as at 25.

These flanged ends 25 are engaged with the jamb 16 by means of a screw, stud bolt or other suitable means designated generally 26. Thus the lower end of the section B is held in proper alined relation to the upper end of the section A.

The outer faces of the jamb 16 are formed with the outwardly and upwardly extending hooks 27 on which are detachably disposed ladder rungs 28 (see Figure 4) and attached to the side faces of the jamb 16 are the vertical guides 29 which are angular in cross section. Slidably mounted within these guides is the chute 30 whose side edges are flanged, as shown in Figure 3 and engage beneath these guides 29. Thus the chute may be shifted vertically from a position, as shown opposite the upper section B downward into any desired relation to the lower section A.

The opening of the silo is normally closed, of course, by a plurality of removable door sections 31, one of which is shown in Figure 4, the jambs 16 being rabbeted upon their inner faces to receive these door sections. The door sections are also lined with a lining of paper or other material designated 14.

In order to provide for settling of the ensilage, a cribbing designated generally 32 is placed on top of the silo, this cribbing being shown as consisting of a plurality of vertical staves 33 held in engagement with each other by the bands or rings 34, these bands or rings being held to the staves by staples and the rings being detachably connected at their ends so that the series of staves may be bent around in a circle, the ends of the bands or rings connected to each other and then the series of staves mounted in plates as a cribbing upon the top of the silo.

For the purpose of supporting this cribbing, I have provided the hooks 35 which engage over the upper edge of the silo proper and are rebent to form supporting hooks 36 upon which the staves rest, as shown most clearly in Figure 2. A ladder 37 which is engaged with the rack or cribbing forms an extension of the ladder constituted by the rungs 28.

In order to provide for an increase in height of the silo, I provide another set of staves or boards 10 connected to each other by the links 11 and held in place by bands 20 and provide a second pair of jambs or uprights 16. One of this second pair of jambs is shown in Figure 6 and designated 16a. The lower end of each of these jambs 16a is formed with a metallic shoe 38 which fits firmly around the lower end of the jamb and is formed of sheet metal. It projects below the lower end of the jamb 16a so that it may be inserted over the upper end of the corresponding jamb 16 so that the jamb 16a will form a continuation of the corresponding jamb 16. The jamb 16a is also provided with the apertures for the passage of bolts 17 and for the passage of the eye bolts 22 and is also provided with the hooks 27 whereby the ladder rungs may be supported thereon. By this means, a third section may be added, to the sections A and B, the rack 32, of course, being disposed upon this third section or indeed a fourth section may be added. Of course, at the junction of the lower end of this third section with the section B, a band such as the band 24 will be applied at the junction between the two sections to hold the uppermost section in proper alinement with the section B.

The silo is lined with waterproof paper or like material designated 14. This paper projects out beyond each plank or stave 10 and beyond the door 31 one inch so that each section of paper overlaps the adjacent section to this end that when the silo is being filled with ensilage, the operator may turn in the direction of this lap and dispose the ensilage in this manner so that the paper may be pressed firmly against the silo walls so as to prevent any air leakage. It will be understood that the chute 30 is to operate upon the jamb sections 16a in exactly the same manner as upon the jamb sections 16 so that in the event that an extension or extensions are desired on a silo and after the ensilage in each extension has been used and the extensions are about to be removed, the chute may be lowered by sliding it down.

It will be seen that I have provided a silo which may be readily set up and readily disassembled when desired, that the construction is such that a silo of any reasonable height may be built and that the silo may be increased in height if found necessary at any time and further that as the ensilage is removed, the upper sections of the silo may be removed. I have further provided a chute which will protect the ensilage which is otherwise exposed by reason of the removal of a door section 31, but which will permit the discharge of the ensilage through the door opening and direct this ensilage downward to the base of the silo. By constructing the silo of staves or planks 10 linked together as described, it is possible to construct the silo of either a larger or smaller diameter as may be deemed best. The rack or cribbing permits a certain amount of ensilage to be disposed within the silo and then to settle and when the ensilage is fully settled and is flush with the top of the silo, the cribbing or rack may be removed.

While I have illustrated certain details of construction and arrangements of parts, I do not wish to be limited thereto as minor changes may be made in this device without departing from the spirit of the invention, as defined in the appended claims.

It can readily be removed. Thus a tenant can erect a silo of this type on leased land without fear of having it become part of the realty, and the silo can be moved from farm to farm as well as from place to place in the barn yard in order to place it in a convenient position to temporary barns or sheds.

It is less expensive and more durable than an ordinary silo. Being that each section of the silo can be assembled and stored under shelter when the ensilage in the section has been fed, only a small portion of the material will be exposed to the wind and weather and that for only a part of each season. For the same reason it requires less material to meet the requirements to resist deterioration and destruction by windstorm. The costs of windstorm insurance can also be saved. The silo is so planned and because of the minimum of material used in its construction, the cost of erecting it is less than that of the average type of silo.

The cribbing on top of the silo makes it possible to utilize the main part of the silo for the storing of ensilage with a minimum of waste material.

I claim:—

1. A silo formed of a plurality of vertical staves in edge-abutted relation and spaced door jambs, means for holding the staves engaged with each other comprising links on each stave, each link being formed with a hook and eye engageable with the hook and eye of the next adjacent stave, and spacing bolts passing through the jambs and detachably engaged with the eyes of adjacent staves.

2. A silo formed of a plurality of vertical staves in edge-abutted relation and spaced door jambs, means for holding the staves engaged with each other comprising links on each stave, each link being formed with a hook and eye engageable with the hook and eye of the next adjacent stave, and bolts passing through the jambs, and bands surrounding the silo and disposed between said links and connected to said last named bolts.

3. A silo formed of a plurality of sections, each section comprising vertical connected staves, and a pair of jambs, means holding the staves of each section in proper relation to the jambs of the section, the jambs of one section abutting against the jambs and staves of the next adjacent section, a sheet metal connecting member attached to one of said jambs of one section and receiving the adjacent end of the corresponding jamb of the next adjacent section, and a sheet metal band extending around the joints between the two sections and detachably connected to said jambs.

4. A silo formed of a plurality of vertical staves in edge-abutted relation and spaced door jambs, means for holding the staves engaged with each other comprising links attached to each stave, each link being formed for detachable engagement with the next adjacent link, and means on the door jambs engaging the links of the next adjacent staves.

ROBERT W. KAATZ.